United States Patent [19]

Ritsema

[11] 4,353,439
[45] Oct. 12, 1982

[54] DRUM BRAKE WITH COMBINED ADJUSTER AND WHEEL CYLINDER

[75] Inventor: Irving R. Ritsema, South Bend, Ind.

[73] Assignee: The Bendix Corporation, Southfield, Mich.

[21] Appl. No.: 193,238

[22] Filed: Oct. 2, 1980

[51] Int. Cl.³ ............................................. F16D 65/56
[52] U.S. Cl. ..................... 188/79.5 GE; 188/196 BA; 188/364
[58] Field of Search ............... 188/79.5 GE, 79.5 GT, 188/79.5 P, 196 BA, 364

[56] References Cited

U.S. PATENT DOCUMENTS

| | | | |
|---|---|---|---|
| 2,224,197 | 12/1940 | Schlueter | 188/79.5 GE |
| 2,345,108 | 3/1944 | Goepfrich . | |
| 2,429,815 | 10/1947 | House | 188/364 |
| 3,540,554 | 11/1970 | Burnett et al. . | |
| 3,712,425 | 1/1973 | Torii et al. . | |
| 3,913,710 | 10/1975 | Margetts | 188/79.5 GE |

FOREIGN PATENT DOCUMENTS

| | | | |
|---|---|---|---|
| 740562 | 10/1943 | Fed. Rep. of Germany | 188/364 |
| 1544028 | 9/1968 | France | 188/79.5 GE |

Primary Examiner—Duane A. Reger
Attorney, Agent, or Firm—Paul David Schoenle; Ken C. Decker

[57] ABSTRACT

A drum brake assembly includes a wheel cylinder (36) and extendible assembly (60) disposed between adjoining ends of a pair of brake shoes. The wheel cylinder includes a pair of pistons (40,42) which are in abutting relation with each other and with the extendible assembly to substantially define a non-braking position for the pair of brake shoes. The extendible assembly is operable to move the pair of pistons within the wheel cylinder in response to an excessive clearance between the pair of brake shoes and a rotating drum.

1 Claim, 2 Drawing Figures

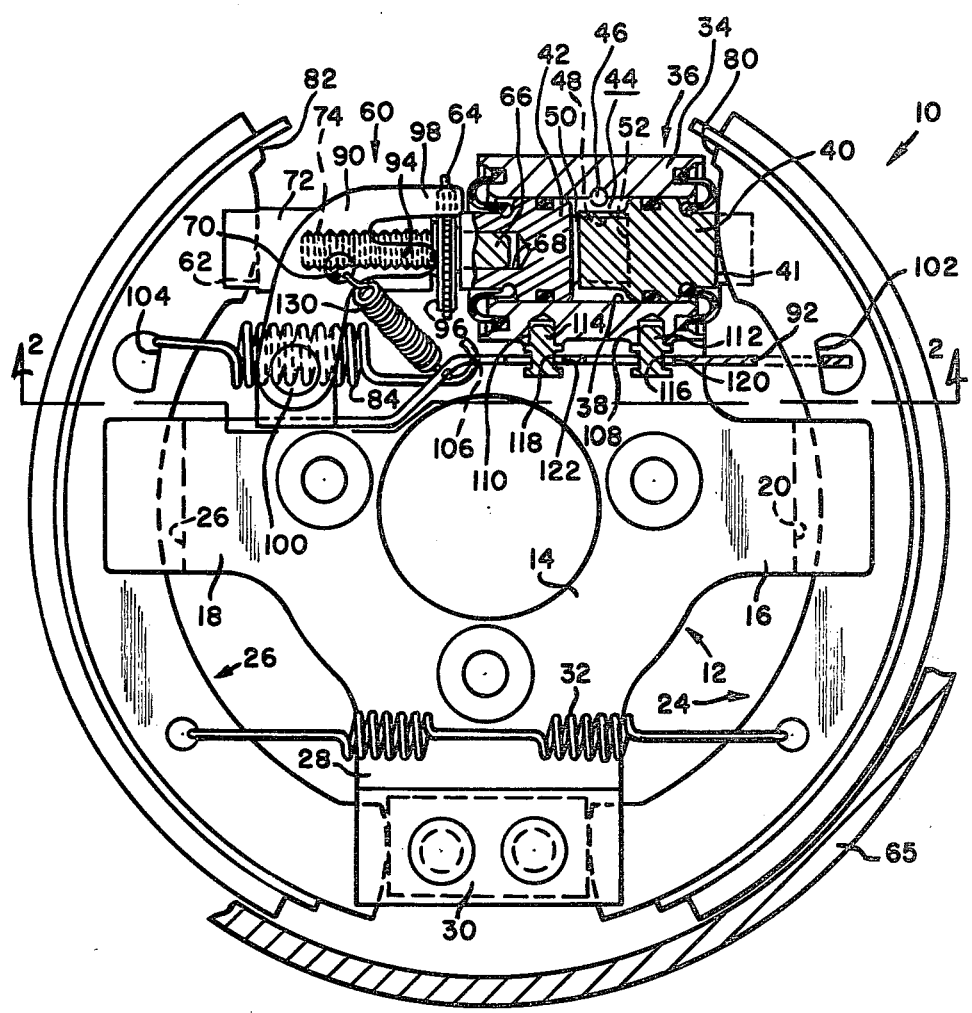
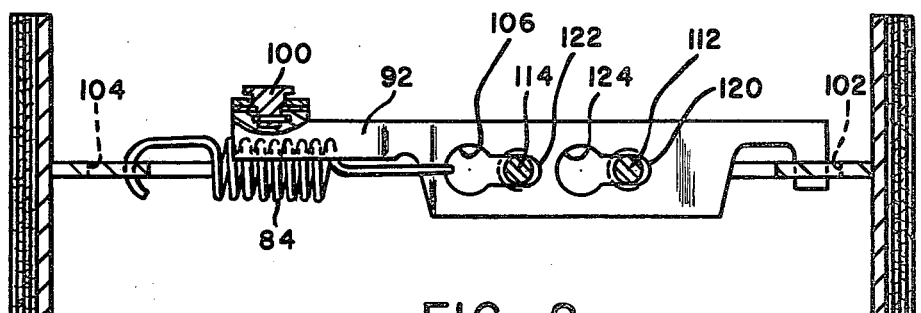
FIG. 1
FIG. 2

DRUM BRAKE WITH COMBINED ADJUSTER AND WHEEL CYLINDER

The invention relates to a drum brake having a backing plate movably supporting a pair of brake shoes. A hydraulic actuator includes a pair of movable pistons which are movable during a brake application to move the pair of brake shoes from a non-braking position to a braking position in engagement with a rotatable member. An extendible assembly cooperates with the pair of brake shoes to substantially maintain a predetermined clearance between the rotatable member and the pair of brake shoes.

The prior art has attempted to integrate or combine the extendible assembly and the hydraulic actuator in order to compactly arrange the components of the drum brake assembly for smaller sizes of drum brakes. This prior art has not been widely accepted by automotive manufacturers either because of servicing problems during repair or cost penalties associated with complicated designs. Some prior art wheel cylinder adjusters also only compensated for lining wear for one brake shoe.

The present invention provides an extendible assembly and wheel cylinder which cooperate during a brake application to engage a pair of brake shoes with a rotatable member. The wheel cylinder includes a pair of pistons. One of the pistons engages one of the pair of brake shoes while the other piston engages the extendible assembly. The extendible assembly is located outside the wheel cylinder; however, a portion of the extendible assembly extends into the wheel cylinder to engage the other piston. The wheel cylinder and extendible assembly are disposed in coaxial relation within a space between adjoining ends of the pair of brake shoes. The wheel cylinder is offset toward the one brake shoe to substantially occupy one-half the space and the extendible assembly is offset toward the other brake shoe to substantially occupy onehalf the space. In a preferred embodiment, the wheel cylinder is formed integrally with the backing plate and the one piston defines a recess for receiving a portion of the other piston, thereby preventing rotation between the pistons.

It is an advantage of the invention that a single extendible assembly is operable to compensate for lining wear to a pair of brake shoes via the pair of pistons within the wheel cylinder. The extendible assembly is also located outside the wheel cylinder for easy servicing during replacement of the pair of brake shoes and the extendible assembly cooperates with the pair of pistons to substantially define a stop for the non-braking position.

One way of carrying out the invention is described in detail below with reference to the accompanying drawings wherein:

FIG. 1 is a side view of a drum brake assembly partly cut away and constructed in accordance with the present invention; and FIG. 2 is a view taken substantially along line 2—2 of FIG. 1.

In FIG. 1, a drum brake assembly 10 includes a backing plate 12 which is adapted to be secured to a portion of an axle assembly in a vehicle. The backing plate 12 includes a center portion 14 with a pair of oppositely extending arms 16 and 18 which are slotted at 20 and 22 to receive a pair of brake shoes 24 and 26. The brake shoe 24 is the trailing shoe in a non-servo drum brake and the brake shoe 26 is the leading shoe in a non-servo drum brake. The backing plate 12 also includes an arm 28 defining an anchor 30 about which the pair of brake shoes pivot during a brake application. A spring 32 biases the pair of brake shoes into engagement with the anchor 30. Opposite the arm 28 is an offset arm 34 which integrally forms a hydraulic actuator or wheel cylinder 36.

The wheel cylinder 36 defines a bore 38 extending through the arm 34 and includes a first piston 40 extending outwardly to engage the brake shoe 24 via slot 41 and a second piston 42 cooperating with the first piston 40 to define a pressure chamber 44. An inlet 46 communicates with a brake fluid pressure generator, such as a master cylinder, for communicating fluid pressure to the pressure chamber 44 during a brake application. The first piston defines a rectangular recess 48 facing the piston 42 and the piston 42 includes a projecting portion 50 telescoping into the recess 48 and abutting a bottom wall 52 of the recess 48.

An extendible assembly 60 is carried by the piston 42 and is in engagement with the brake shoe 26 via slot 62. The extendible assembly 60 includes a star wheel 64 with a cylindrical stem 66 extending into a blind opening 68 on piston 42 and a threaded item 70 cooperating with a spacer 72 having internal threads 74.

The adjoining ends 80 and 82 of respective brake shoes 24 and 26 define a space therebetween which is occupied by the wheel cylinder and the extendible assembly. The offset wheel cylinder 36 occupies substantially one half of the space, while the extendible assembly 60 occupies one half the space. The wheel cylinder 36 is offset toward the trailing brake shoe 24 and the extendible assembly is adjoining the leading brake shoe 26. A retraction spring 84 cooperates with the pair of brake shoes in a manner described hereinafter to bias the latter to a non-braking position wherein each respective brake shoe 24 and 26 is abutting the bottom of slots 41 and 62 and the piston projection 50 is abutting the piston bottom wall 52.

In order to control extension of the extendible assembly 60 an adjusting pawl 90 is engageable with the star wheel 64 to impart rotation to the star wheel 64 in response to an excessive clearance between the pair of brake shoes and a rotating drum 65. The adjusting pawl 90 is pivotally carried on a connecting member 92 and is provided with a first arm 94 abutting a side wall 96 of the star wheel 64 at an intermediate radial position. A second arm 98 of the adjusting pawl 90 is engageable with ratchet teeth on the outer periphery of the star wheel. A pivot pin 100 secures the adjusting pawl 90 to the connecting member 92. The connecting member 92 extends into an opening 102 in brake shoe 24 to move with the latter during braking. The retraction spring 84 extends from an opening 104 in brake shoe 26 to an opening 106 in the connecting member to urge the connecting member and brake shoe 24 in the direction of brake shoe 26.

Viewing FIGS. 1 and 2, the wheel cylinder 36 includes a pair of openings 108 and 110 for fixedly receiving a pair of plugs 112 and 114. In the alternative, this pair of plugs could be integral with the wheel cylinder. The pair of plugs include recesses 116 and 118 and the connecting member 92 includes slots 120 and 122 for receiving the respective plugs 112 and 114 such that the connecting member 92 is disposed within the recesses. The slot 122 leads to the opening 106 and the slot 120 leads to an opening 124. The openings 106 and 124 are larger in diameter than the diameter of the plugs 112 and 114 so that the connecting member openings 106 and 124 are aligned with the plug recesses 116 and 118 and the end of the connecting member is inserted in the brake shoe opening 102 before the spring 84 is attached to the connecting member via opening 106. The spring biases the connecting member toward the brake shoe 26 to movably support the connecting member within the recesses 116 and 118.

In the non-braking position illustrated, the plugs 112 and 114 are disposed to the right side of the respective slots 120 and 122. As the brake shoes 24 and 26 experience lining wear the extendible assembly is operable to increase the dimension of the space between adjoining ends 80 and 82. This compensation for lining wear causes the plugs 112 and 114 to be repositioned away from the right end of slots 120 and 122 toward, but spaced from, the openings 124 and 106.

During a brake application, the brake shoes 24 and 26 are urged by the wheel cylinder and extendible assembly to separate from each other. The piston 42 biases the star wheel 64 to move to the left, viewing FIG. 2, while the brake shoe 24 pulls the connecting member 92 to the right. With the arm 94 abutting the side wall of star wheel 64, the adjusting pawl 90 is pivoted counterclockwise about pin 100. If the clearance between the brake shoes and rotatable drum is excessive, the pivoting motion of the adjusting pawl 90 will cause the arm 98 to index to a successive ratchet tooth on the star wheel. Consequently, upon termination of braking, the spring 130 which extends from the connecting member 92 to the adjusting pawl 90 causes the latter to rotate clockwise about pin 100 and impart rotation to the star wheel to extend the extendible assembly 60. This action enables the extendible assembly to cooperate with the abutting pair of pistons to reposition the pair of brake shoes in closer proximity to the rotatable drum.

I claim:

1. In a drum brake assembly having a pair of brake shoes engageable with a rotatable member to be braked, a wheel cylinder cooperating with the pair of brake shoes to move the latter into engagement with the rotatable member during a brake application, the wheel cylinder defining a bore for movably receiving a pair of pistons, and an extendible assembly cooperating with the pair of brake shoes to substantially maintain a predetermined clearance with the member to be braked, the wheel cylinder, the extendible assembly being disposed within a space between adjoining ends of said pair of brake shoes and including a star wheel rotatably disposed within the space, one of said pistons engaging one of said pair of brake shoes, the other of said pistons engaging said extendible assembly, said extendible assembly being disposed between said other piston and said other brake shoe, and said extendible assembly being operable to increase the space between said adjoining ends of said pair of brake shoes by moving said pair of pistons within said wheel cylinder away from said other brake shoe, characterized by said other piston including a portion extending outwardly of the wheel cylinder and including a blind bore receiving a portion of said star wheel in order to rotatably support the latter adjacent the wheel cylinder, said one piston including a recess receiving a portion of said other piston to prevent rotation therebetween, and said one piston including a portion extending outwardly of the wheel cylinder to define a slot for receiving said one brake shoe.

* * * * *